United States Patent Office 3,402,202
Patented Sept. 17, 1968

3,402,202
PROCESS FOR PREPARING 3,3'-DIAMINO-
2,2',4,4',6,6'-HEXANITROBIPHENYL
Delton William Hein, Darien, Conn., and Stanley Joseph
Radkowski, Pulaski, Pa., assignors to American Cyanamid Company, Stamford, Conn., a corporation of Maine
No Drawing. Filed Aug. 10, 1965, Ser. No. 478,730
6 Claims. (Cl. 260—581)

ABSTRACT OF THE DISCLOSURE

A chlorinated hydrocarbon such as ethylene dichloride is employed to advantage as a solvent in Ullmann Reactions and particularly in all the steps of the process for making 3,3-diamino-2,2',4,4',6,6'-hexanitrobiphenyl comprising (1) nitrating m-bromoanisole to form 3-bromo-2,4,6-trinitroanisole, (2) condensing the latter in the presence of copper powder (Ullmann Reaction) to form 3,3'-dimethoxy - 2,2',4,4',6,6' - hexanitrobiphenyl and (3) aminating the product of (2) with anhydrous ammonia to form the 3,3-diamino-2,2',4,4',6,6'-hexanitrobiphenyl.

---

This invention relates to the production of 3,3'-diamino-2,2',4,4',6,6'-hexanitrobiphenyl,

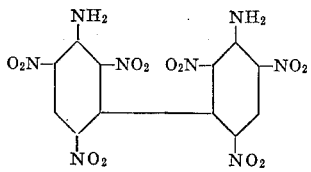

which is useful as a component in explosive compositions.

The invention is particularly concerned with an improved process for preparing this compound, especially on a commercial scale.

Heretofore, the preparation of 3,3'-diamino-2,2',4,4',6,6'-hexanitrobiphenyl has been accomplished on a laboratory scale by a process involving the following sequence of reaction steps (1) nitrating m-bromoanisole directly, by addition to a mixture of nitric and sulfuric acids, to form 3-bromo-2,4,6-trinitroanisole (2) condensing the latter in the presence of copper powder (Ullmann Reaction) to form 3,3' - dimethoxy - 2,2',4,4'-6,6'-hexanitrobiphenyl, (3) aminating the product of (2) by reaction with anhydrous ammonia, and (4) recovering the crystalline 3,3'-diamino-2,2',4,4',6,6'-hexanitrobiphenyl by filtration.

While this process is generally satisfactory for the preparation of 3,3'-diamino-2,2',4,4',6,6'-hexanitrobiphenyl on a laboratory basis, when scale-up to commercial production is attempted a number of difficulties are encountered, principally in connection with condensaton step 2. Thus, this condensation reaction is characterized by a violent exotherm which, although not difficult to control on a small scale operation, becomes a major problem on scale-up due to the great amount of heat which must be dissipated.

A simple and economical means of providing temperature control in this reaction would of course constitute an important improvement in the process from the standpoint of its commercial utility. The present invention provides such a means. Accordingly, it is the prime object of this invention to provide an improved 3-step process for preparing 3,3' - diamino - 2,2',4,4',6,6' - hexanitrobiphenyl in which the effects of the violent exotherm associated with step 2 thereof, i.e. the condensation (Ullmann) reaction, is completely eliminated. Other and further objects and advantages of the invention will become apparent from the following description.

It has now been found that by conducting the condensation (Ullmann) reaction in the presence of ethylene dichloride, the effect of the violent exotherm normally associated therewith is eliminated. Thus, in the presence the ethylene dichloride, the heat of reaction is given off so slowly that it is readily dissipated by conducting the reaction under reflux at the boiling point of the solvent. This mitigating effect on the reaction exotherm is not obtained with other well known solvents, such as toluene, nitrobenzene and chlorinated aromatic solvents, such as monochlorobenzene and o-dichlorobenzene.

Solvents utilizable in the invention are the normally liquid chlorinated aliphatic hydrocarbons having boiling points of from about 50° C. to about 200° C. of which the following may be mentioned as specific examples. Carbon tetrachloride, 1,2-dichloroethane (ethylene dichloride), 1,1,2,2 - tetrachloroethane, 1,1,2 - trichloroethane, monochloropropane, 1,2 - dichloropropane, 2,2 - dichloropropane, 1,3-dichloropropane, monochlorobutane, monochlorohexane, monochloroheptane and monochlorooctane. Ethylene dichloride is particularly preferred in view of its availability and because its boiling point is particularly suitable for the reaction.

The amount of solvent used in the process may range from about 1 to about 2 liters thereof, per mole of m-bromoanisole used as starting material.

Besides the advantages of temperature control in the condensation reaction (step 2), the use of the solvent in all three of the process steps provides further distinct advantages in the process. These include the following.

The intermediate products of the process, i.e. 3-bromo-2,4,6-trinitroanisole (step 1) and the 3,3'-dimethoxy-2,2',4,4',6,6'-hexanitroanisole (step 2) are soluble in the solvent. These intermediate products, therefore, need not be separated out in the course of the process, but the solvent solutions thereof are utilized in the next succeeding steps. However, the final product, i.e. the 3,3'-diamino-2,2',4,4',6,6'-hexanitrobiphenyl, is insoluble in the solvent, so that is readily separated and recovered in a highly pure state.

In the nitration step, the solvent provides a fluid reaction mass which facilitates stirring and temperature control. Also, since the product is soluble in the chlorinated alipatic hydrocarbon solvent, it is easily separated from the spent acid. Thus, when the reaction is completed, agitation is stopped and the reaction mixture allowed to stratify into a solvent product layer (top) and a spent acid layer (bottom). The acid layer is then simply drawn off. (This eliminates the cumbersome conventional procedure of drowning the reaction mass in a large volume of water and filtering off the precipitated product. The product solution is then purified by simply washing with carbonate solution and either passing through an alumina column or adding alumina, stirring and filtering. (This avoids the more difficult neutralization of a solid product and its purification by recrystallization with attendant losses of product.) Also, the instant procedure accomplishes complete removal of phenolic impurities, water and residual acid, even small amounts of which have serious adverse effects on the subsequent sensitive Ullmann reaction.

In the condensation step, the solvent provides an efficient reaction in which side reactions which occur in the absence of the solvent or in the presence of prior art solvents, such as nitrobenzene, monochlorobenzene, o-dichlorobenzene and toluene, are held to a minimum.

In the amination step, the 3,3' - diamino - 2,2',4,4',6,6'-hexanitrobiphenyl product which is formed as a precipitates is of very high purity, so that recrystallization thereof is not necessary. However, recrystallization does provide improved granulation and it is therefore not precluded.

The following example, utilizes ethylene dichloride as the solvent, is illustrative of the 3-step process for producing 3,3' - diamino - 2,2',4,4'6,6' - hexanitrobiphenyl in accordance with this invention.

EXAMPLE I

(1) Nitration of 3-bromoanisole

A mixture of 270 ml. of 90% nitric acid and 500 ml. of 30% oleum was prepared.

An aliquot of 192 ml. of the above mixed acid was placed in a 1-liter, round-bottom flask equipped with a mechanical stirrer, a thermometer, and a dropping funnel and 200 ml. of ethylene dichloride was added thereto. 47.6 g. of 3-bromoanisole in 100 ml. ethylene dichloride was then added over a 20-minute period while maintaining the temperature below 30° C. An additional 100 ml. of ethylene dichloride was then added and the temperature of the mixture elevated to 50–60° C. This temperature was maintained for one hour. Stirring was then stopped and the mixture allowed to stratify. The bottom, spent-acid layer, was then drawn off and the solvent layer neutralized with 600 ml. of 5% carbonate solution. Remaining traces of acids, phenols and water were then removed by passing the neutralized solution through a column of activated alumina.

A sample of the product solution was stripped of ethylene dichloride on a rotary vacuum stripper. The crystalline virgin 3-bromo-2,4,6-trinitroanisole melted at 95–97° C. The yield was 71.0 g. (88.2% of theory). The purity of the product was superior to any obtainable by the conventional direct nitration-drowning technique.

(2) Condensation of 3-bromo-2,4,6-trinitroanisole (Ullmann Reaction)

The 434 ml. of the ethylene dichloride product solution from the above reaction was placed in a 1-liter round-bottom flask equipped with a mechanical stirrer, a thermometer and a reflux condenser. The solution was then heated to 70–75° C. and 33.2 g. of copper powder was added with rapid agitation. The mixture was then heated under reflux for two and one-half hours with no noticeable exotherm. The temperature was then lowered below reflux and 5 g. of activated carbon and 5 g. of filer-aid added. The mixture was again heated under reflux for five minutes and filtered hot. The filter cake was then washed with 50 ml. of hot ethylene dichloride in several aliquots.

(3) Amination of 3,3'-dimethoxy-2,2',4,4',6,6'-hexanitrobiphenyl

A volume of 100 ml. of methanol was added to the filtrate obtained above in a 1-liter round-bottom flask equipped with a mechanical stirrer, a thermometer, and a gas inlet tube beneath the surface of the solution. The solution was saturated with anhydrous ammonia, whereupon the aminated product precipitated. Excess ammonia was then expelled by heating the mixture to 50° C. The mixture was then filtered and the product washed with cold methanol. The yield of bright yellow crystalline 3,3'-diamino - 2,2',4,4',6,6' - hexanitrobiphenyl was 38.6 g. (77.3% of theory). The melting point was significantly higher than recrystallized products prepared by previously known processes.

The procedure of Example I, has been carried out on a 30-pound product scale with similar results.

As seen from step (2) of Example I, the conduction of the condensation reaction in the ethylene dichloride solvent exhibited no noticeable exotherm. The use of the solvents of the invention is similarly effective in the other Ullmann condensation reactions exhibiting violent exotherms, of which the following is an illustrative example.

EXAMPLE II

Condensation of picryl chloride

Ten grams of picryl chloride was dissolved in 200 ml. of ethylene dichloride contained in a 500 ml. round-bottom flask equipped with a mechanical stirrer, thermometer and reflux condenser. The solution was heated to 70–75° C. and 4.4 g. of copper powder (Natural Copper 44–F) was added with rapid agitation. The mixture was then heated under reflux (84° C.) for two hours with no noticeable exotherm. At the completion of the reaction the temperature was lowered and the mixture containing the precipitated hexanitrobiphenyl product was filtered. The filter cake was extracted with 50 cc. of acetone. The extract was then concentrated on a steam bath until bumping occurred and was filtered hot. The filtrate was cooled and the solid hexanitrobiphenyl removed from the cooled filtrate. The filtrate was again concentrated and filtered. A yield of 6 g. (70.5% of theory) was recovered. The use of the herein described halogenated aliphatic hydrocarbon solvents in the conduction of Ullmann condensation reactions exhibiting high exotherms is contemplated as a particular embodiment of this invention, the choice of solvent used being dictated by the temperature required for the particular reaction and the boiling point of the solvent.

Although the present invention has been described and illustrated herein, in terms of specific examples and embodiments, it is not intended that the scope itself be limited in any way thereby, but only as defined in the following claims.

We claim:

1. In the process for preparing 3,3'-diamino-2,2',4,4',-6,6'-hexanitrobiphenyl comprising the steps of (1) nitrating m-bromoanisole to form 3-bromo-2,4,6-trinitroanisole (2) condensing the 3-bromo-2,4,6-trinitroanisole in the presence of copper powder to form 3,3'-dimethoxy-2,2'-4,4',6,6'-hexanitrobiphenyl and (3) reacting the 3,3'-dimethoxy-2,2',4,4',6,6'-hexanitrobiphenyl with anhydrous ammonia to form 3,3'-diamino-2,2',4,4',6,6'-hexanitrobiphenyl, the improvement which comprises conducting said steps 1, 2 and 3 in the presence of a normally liquid chlorinated aliphatic hydrocarbon, having a boiling point of from about 50° C. to about 200° C. as solvent.

2. In the process for preparing 3,3'-diamino-2,2',4,4',-6,6'-hexanitrobiphenyl comprising the steps of (1) nitrating m-bromoanisole to form 3 - bromo - 2,4,6 - trinitroanisole (2) condensing the 3 - bromo - 2,4,6 - trinitroanisole in the presence of copper powder to form 3,3'-dimethoxy - 2,2',4,4',6,6' - hexanitrobiphenyl and (3) reacting the 3,3'-dimethoxy-2,2',4,4',6,6'-hexanitrobiphenyl with anhydrous ammonia to form 3,3'-diamino-2,2',4,4',-6,6'-hexanitrobiphenyl, the improvement which comprises conducting said steps 1, 2 and 3 in the presence of ethylene dichloride as solvent.

3. In the conduction of Ullmann condensation reactions characterized by a violent exotherm, the improvement which comprises utilizing a normally liquid chlorinated aliphatic hydrocarbon having a boiling point of from about 50° C. to about 200° C. as solvent.

4. In the conduction of Ullmann condensation reactions characterized by a violent exotherm, the improvement which comprises utilizing ethylene dichloride as solvent.

5. In conducting the Ullmann condensation of 3-bromo-2,4,6-trinitroanisole to 3,3'-dimethoxy-2,2',4,4',6,6'-hexanitrobiphenyl, the improvement which comprises utilizing ethylene dichloride as solvent.

6. In conducting the Ullmann condensation of picryl chloride to hexanitrobiphenyl, the improvement which comprises utilizing ethylene dichloride as solvent.

References Cited

UNITED STATES PATENTS 3,278,604  10/1966  Hoffman et al. _____ 260—581
3,320,320  5/1967  Kamlet et al. _____ 260—581

CHARLES B. PARKER, *Primary Examiner.*

P. C. IVES, *Assistant Examiner.*